US010868638B2

(12) United States Patent
Li et al.

(10) Patent No.: US 10,868,638 B2
(45) Date of Patent: Dec. 15, 2020

(54) TRANSMISSION/RECEPTION POINT (TRP) SELECTION FOR RETRANSMISSIONS IN A COORDINATED MULTIPOINT NETWORK

(71) Applicant: QUALCOMM Incorporated, San Diego, CA (US)

(72) Inventors: Chong Li, Weehawken, NJ (US); Junyi Li, Chester, NJ (US); Piyush Gupta, Bridgewater, NJ (US); Hua Wang, Basking Ridge, NJ (US); Karl Georg Hampel, Hoboken, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 16/255,665

(22) Filed: Jan. 23, 2019

(65) Prior Publication Data

US 2019/0229852 A1 Jul. 25, 2019

Related U.S. Application Data

(60) Provisional application No. 62/621,963, filed on Jan. 25, 2018.

(51) Int. Cl.
*H04L 1/08* (2006.01)
*H04L 1/18* (2006.01)
(Continued)

(52) U.S. Cl.
CPC .............. *H04L 1/08* (2013.01); *H04B 7/024* (2013.01); *H04L 1/0026* (2013.01); *H04L 1/18* (2013.01);
(Continued)

(58) Field of Classification Search
CPC ... H04L 1/1887; H04L 5/0055; H04L 1/0026; H04L 5/0044; H04L 1/1825; H04L 1/08; H04L 1/18; H04B 7/024
See application file for complete search history.

(56) References Cited

U.S. PATENT DOCUMENTS

2019/0335495 A1* 10/2019 Yi ..................... H04W 72/1247

FOREIGN PATENT DOCUMENTS

EP        2242306 A1   10/2010
WO     2016199403 A1   12/2016

OTHER PUBLICATIONS

Huawei, PDSCH reliability for URLLC, Agenda Item: 7.3.3.7, 3GPP TSG RAN ,vGt Meeting #91,Reno, USA, Nov. 27-Dec. 1, 2017.*

(Continued)

*Primary Examiner* — Yemane Mesfin
*Assistant Examiner* — Henry Baron
(74) *Attorney, Agent, or Firm* — Harrity & Harrity, LLP

(57) ABSTRACT

Various aspects of the present disclosure generally relate to wireless communication. In some aspects, a user equipment (UE) may determine that a communication from a transmission/reception point (TRP), included in a coordinated multipoint network, was not successfully received. The UE may transmit a plurality of negative acknowledgements (NACKs), corresponding to the communication, to a plurality of TRPs included in the coordinated multipoint network based at least in part on determining that the communication was not successfully received. The UE may receive a retransmission of the communication from one or more TRPs of the plurality of TRPs. Numerous other aspects are provided.

30 Claims, 13 Drawing Sheets

(51) Int. Cl.
*H04B 7/024* (2017.01)
*H04L 5/00* (2006.01)
*H04L 1/00* (2006.01)

(52) U.S. Cl.
CPC .......... *H04L 1/1825* (2013.01); *H04L 1/1887* (2013.01); *H04L 5/0044* (2013.01); *H04L 5/0055* (2013.01); *H04L 1/189* (2013.01); *H04L 1/1858* (2013.01); *H04L 2001/0093* (2013.01)

(56) References Cited

OTHER PUBLICATIONS

International Search Report and Written Opinion—PCT/US2019/014915—ISA/EPO—dated Aug. 1, 2019.
Huawei., et al., "POSCH Reliability for URLLC", 3GPP Draft; R1-1719407, 3rd Generation Partnership Project (3GPP), Mobile Competence Centre, 650, Route Des Lucioles, F-06921 Sophia-Antipolis Cedex, France, vol. Ran WG1. No. Reno. USA; Nov. 27, 2017-Dec. 1, 2017, Nov. 18, 2017 (Nov. 18, 2017), 8 Pages, XP051369316, Retrieved from the Internet: URL: http://www.3gpp.org/ftp/tsg_ranNVG1_RL1fTSGR1_91/Docs/ [retrieved on Nov. 18, 2017], Figure 5a, p. 5, Lines 1-15.
Partial International Search Report—PCT/US2019/014915—ISA/EPO—dated Apr. 29, 2019.

* cited by examiner

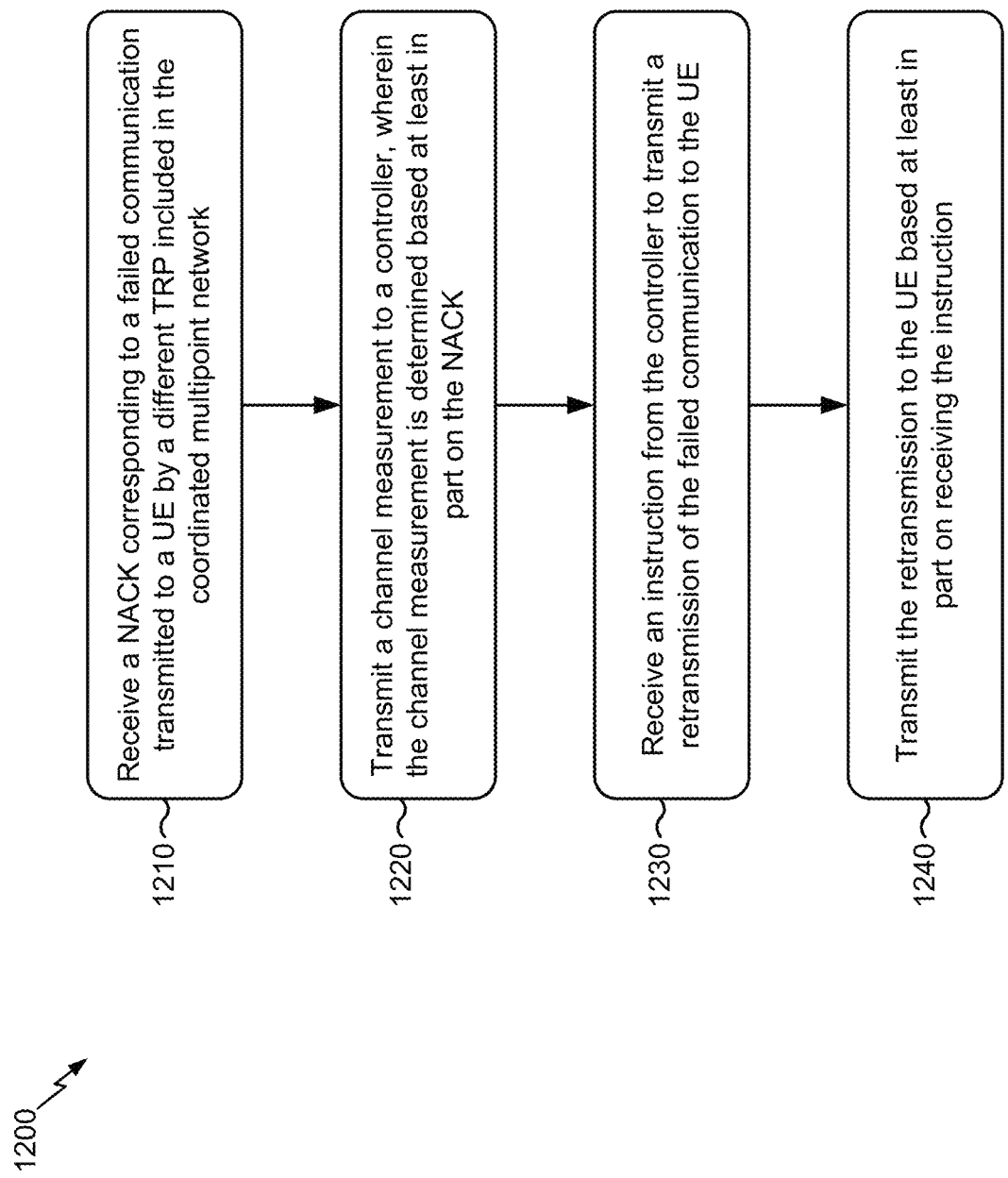

TRANSMISSION/RECEPTION POINT (TRP) SELECTION FOR RETRANSMISSIONS IN A COORDINATED MULTIPOINT NETWORK

CROSS-REFERENCE TO RELATED APPLICATIONS UNDER 35 U.S.C. § 119

This application claims priority to U.S. Provisional Patent Application No. 62/621,963, filed on Jan. 25, 2018, entitled "TECHNIQUES AND APPARATUSES FOR TRANSMISSION/RECEPTION POINT (TRP) SELECTION FOR RETRANSMISSIONS IN A COORDINATED MULTIPOINT NETWORK," which is hereby expressly incorporated by reference herein.

FIELD OF THE DISCLOSURE

Aspects of the present disclosure generally relate to wireless communication, and more particularly to techniques and apparatuses for transmission/reception point (TRP) selection for retransmissions in a coordinated multipoint network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining that a communication from a transmission/reception point (TRP), included in a coordinated multipoint network, was not successfully received; transmitting a plurality of negative acknowledgements (NACKs), corresponding to the communication, to a plurality of TRPs included in the coordinated multipoint network based at least in part on determining that the communication was not successfully received; and receiving a retransmission of the communication from one or more TRPs of the plurality of TRPs.

In some aspects, a method of wireless communication, performed by a controller, may include receiving a plurality of channel measurements corresponding to a plurality of NACKs, wherein the plurality of NACKs are received by a plurality of TRPs included in a coordinated multipoint network, wherein the plurality of NACKs correspond to a same failed communication transmitted to a UE by at least one TRP of the plurality of TRPs; determining one or more TRPs, of the plurality of TRPs, for a retransmission of the failed communication based at least in part on the plurality of channel measurements; and instructing the one or more TRPs to transmit the retransmission to the UE.

In some aspects, a method of wireless communication, performed by a TRP included in a coordinated multipoint network, may include receiving a NACK corresponding to a failed communication transmitted to a UE by a different TRP included in the coordinated multipoint network; transmitting a channel measurement to a controller, wherein the channel measurement is determined based at least in part on the NACK; receiving an instruction from the controller to transmit a retransmission of the failed communication to the UE; and transmitting the retransmission to the UE based at least in part on receiving the instruction.

In some aspects, a UE for wireless communication may include memory and one or more processors operatively coupled to the memory. The memory and the one or more processors may be configured to determine that a communication from a TRP, included in a coordinated multipoint network, was not successfully received; transmit a plurality of NACKs, corresponding to the communication, to a plurality of TRPs included in the coordinated multipoint network based at least in part on determining that the communication was not successfully received; and receive a retransmission of the communication from one or more TRPs of the plurality of TRPs.

In some aspects, a controller for wireless communication may include memory and one or more processors operatively coupled to the memory. The memory and the one or more processors may be configured to receive a plurality of channel measurements corresponding to a plurality of NACKs, wherein the plurality of NACKs are received by a plurality of TRPs included in a coordinated multipoint network, wherein the plurality of NACKs correspond to a same failed communication transmitted to a UE by at least one TRP of the plurality of TRPs; determine one or more TRPs, of the plurality of TRPs, for a retransmission of the failed communication based at least in part on the plurality of channel measurements; and instruct the one or more TRPs to transmit the retransmission to the UE.

In some aspects, a TRP, included in a coordinated multipoint network, for wireless communication may include memory and one or more processors operatively coupled to the memory. The memory and the one or more processors may be configured to receive a NACK corresponding to a failed communication transmitted to a UE by a different TRP included in the coordinated multipoint network; transmit a channel measurement to a controller, wherein the channel measurement is determined based at least in part on the NACK; receive an instruction from the controller to transmit a retransmission of the failed communication to the UE; and transmit the retransmission to the UE based at least in part on receiving the instruction.

In some aspects, a non-transitory computer-readable medium may store one or more instructions for wireless communication. The one or more instructions, when executed by one or more processors of a UE, may cause the one or more processors to determine that a communication from a TRP, included in a coordinated multipoint network, was not successfully received; transmit a plurality of NACKs, corresponding to the communication, to a plurality of TRPs included in the coordinated multipoint network based at least in part on determining that the communication was not successfully received; and receive a retransmission of the communication from one or more TRPs of the plurality of TRPs.

In some aspects, a non-transitory computer-readable medium may store one or more instructions for wireless communication. The one or more instructions, when executed by one or more processors of a controller, may cause the one or more processors to receive a plurality of channel measurements corresponding to a plurality of NACKs, wherein the plurality of NACKs are received by a plurality of TRPs included in a coordinated multipoint network, wherein the plurality of NACKs correspond to a same failed communication transmitted to a UE by at least one TRP of the plurality of TRPs; determine one or more TRPs, of the plurality of TRPs, for a retransmission of the failed communication based at least in part on the plurality of channel measurements; and instruct the one or more TRPs to transmit the retransmission to the UE.

In some aspects, a non-transitory computer-readable medium may store one or more instructions for wireless communication. The one or more instructions, when executed by one or more processors of a TRP included in a coordinated multipoint network, may cause the one or more processors to receive a NACK corresponding to a failed communication transmitted to a UE by a different TRP included in the coordinated multipoint network; transmit a channel measurement to a controller, wherein the channel measurement is determined based at least in part on the NACK; receive an instruction from the controller to transmit a retransmission of the failed communication to the UE; and transmit the retransmission to the UE based at least in part on receiving the instruction.

In some aspects, an apparatus for wireless communication may include means for determining that a communication from a TRP, included in a coordinated multipoint network, was not successfully received; means for transmitting a plurality of NACKs, corresponding to the communication, to a plurality of TRPs included in the coordinated multipoint network based at least in part on determining that the communication was not successfully received; and means for receiving a retransmission of the communication from one or more TRPs of the plurality of TRPs.

In some aspects, an apparatus for wireless communication may include means for receiving a plurality of channel measurements corresponding to a plurality of NACKs, wherein the plurality of NACKs are received by a plurality of TRPs included in a coordinated multipoint network, wherein the plurality of NACKs correspond to a same failed communication transmitted to a UE by at least one TRP of the plurality of TRPs; means for determining one or more TRPs, of the plurality of TRPs, for a retransmission of the failed communication based at least in part on the plurality of channel measurements; and means for instructing the one or more TRPs to transmit the retransmission to the UE.

In some aspects, an apparatus, included in a coordinated multipoint network, for wireless communication may include means for receiving a NACK corresponding to a failed communication transmitted to a UE by a different apparatus included in the coordinated multipoint network; means for transmitting a channel measurement to a controller, wherein the channel measurement is determined based at least in part on the NACK; means for receiving an instruction from the controller to transmit a retransmission of the failed communication to the UE; and means for transmitting the retransmission to the UE based at least in part on receiving the instruction.

Aspects generally include a method, apparatus, system, computer program product, non-transitory computer-readable medium, user equipment, base station wireless communication device, controller, transmission/reception point, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 10-12 are diagrams illustrating example processes, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
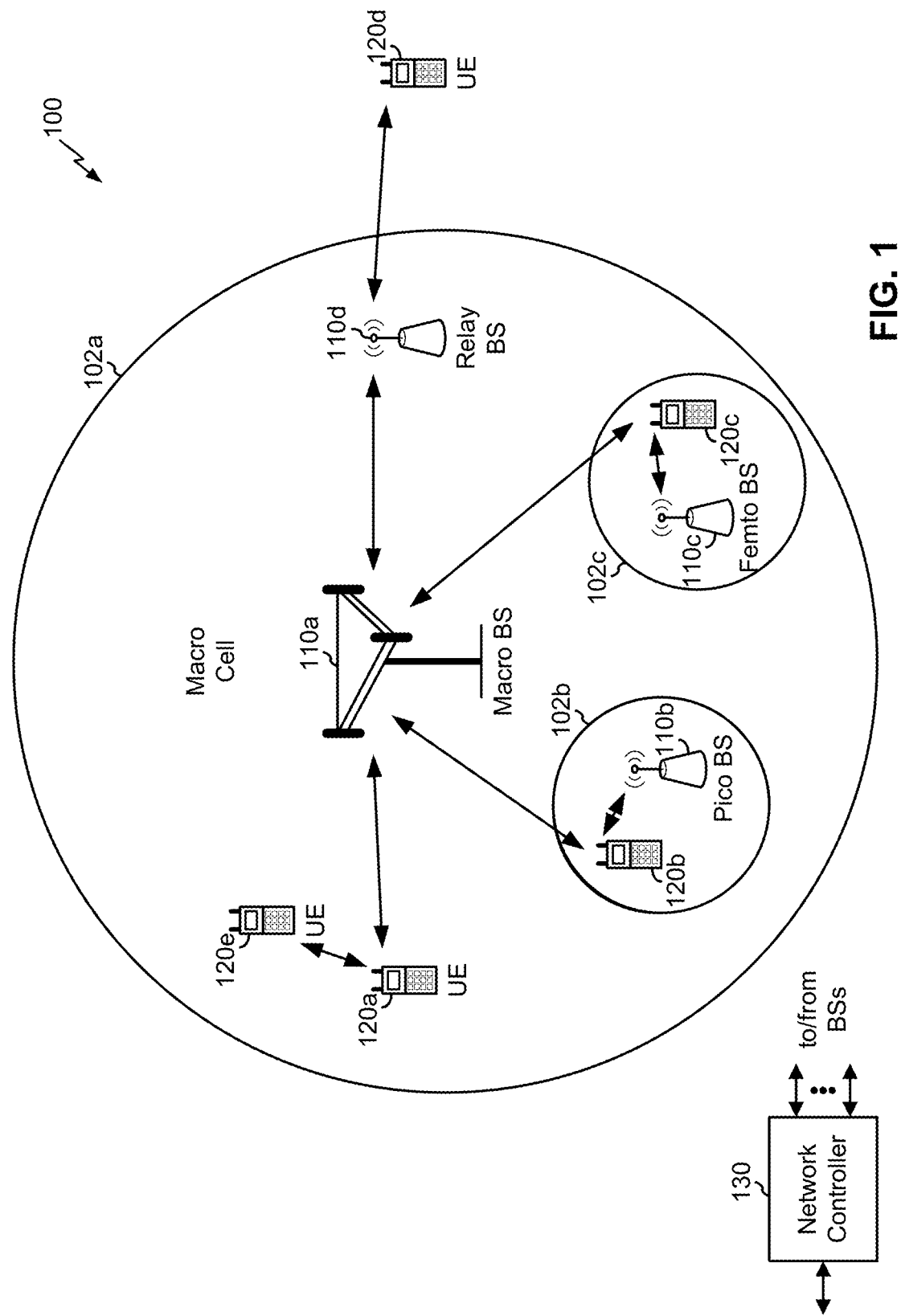
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts)

whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, actuators, programmable logic controllers (PLCs), meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
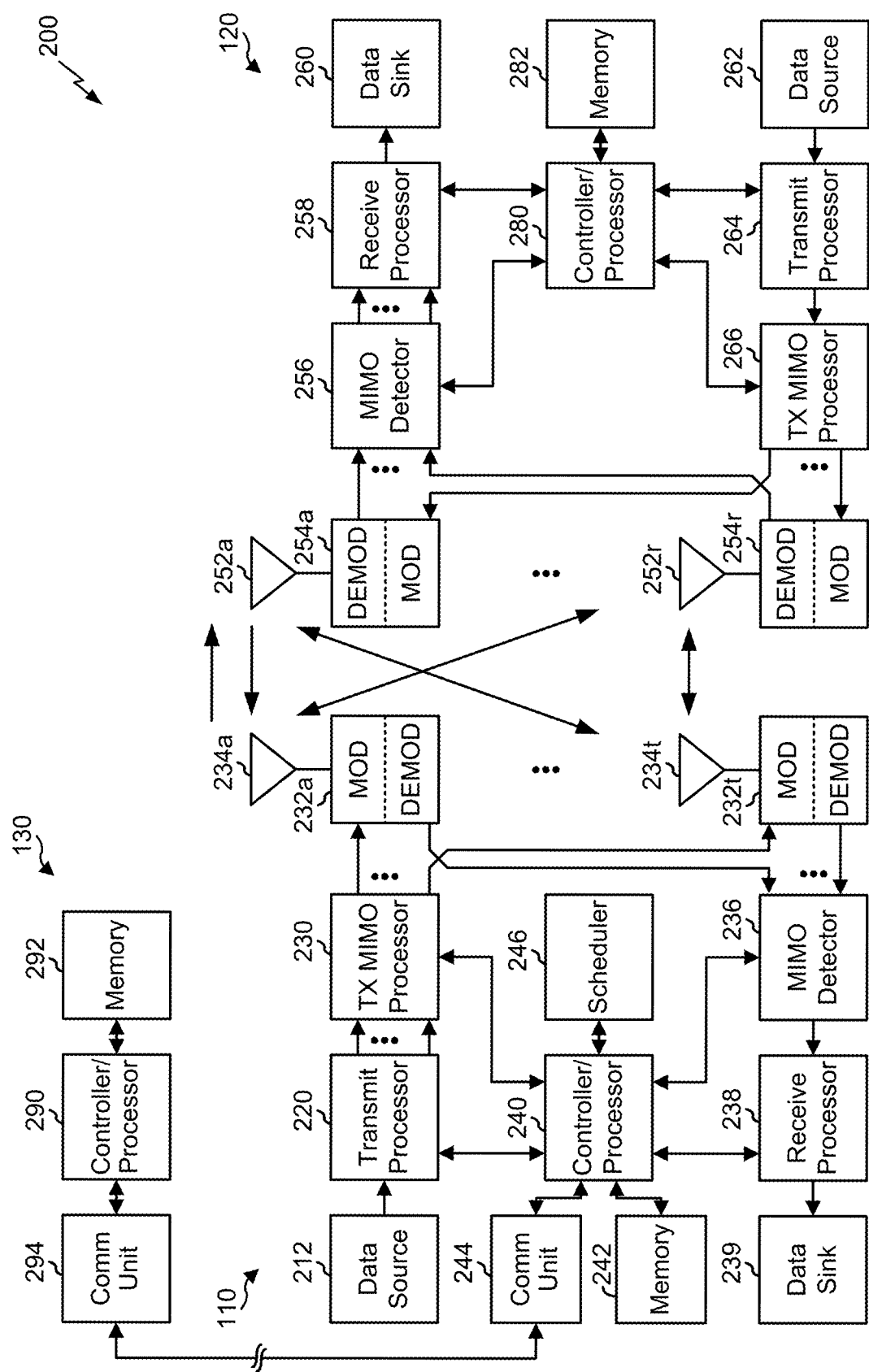
FIG. 2 is a block diagram conceptually illustrating an example of a base station (BS) in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with TRP selection for retransmissions in a coordinated multipoint network, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, process 1200 of FIG. 12, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining that a communication from a transmission/reception point (TRP), included in a coordinated multipoint network, was not successfully received; means for transmitting a plurality of negative acknowledgements (NACKs), corresponding to the communication, to a plurality of TRPs included in the coordinated multipoint network based at least in part on determining that the communication was not successfully received; means for receiving a retransmission of the communication from one or more TRPs of the plurality of TRPs; and/or the like. In some aspects, such means may include one or more components of UE 120 described in connection with FIG. 2.

In some aspects, base station 110 and/or network controller 130 may include means for receiving a plurality of channel measurements corresponding to a plurality of NACKs, wherein the plurality of NACKs are received by a plurality of TRPs included in a coordinated multipoint network, wherein the plurality of NACKs correspond to a same failed communication transmitted to a UE by at least one TRP of the plurality of TRPs; means for determining one or more TRPs, of the plurality of TRPs, for a retransmission of the failed communication based at least in part on the plurality of channel measurements; means for instructing the one or more TRPs to transmit the retransmission to the UE; and/or the like. In some aspects, such means may include one or more components of base station 110 and/or network controller 130 described in connection with FIG. 2.

In some aspects, base station 110 may include means for receiving a NACK corresponding to a failed communication transmitted to a UE by a different TRP included in the coordinated multipoint network; means for transmitting a channel measurement to a controller, wherein the channel measurement is determined based at least in part on the NACK; means for receiving an instruction from the controller to transmit a retransmission of the failed communication to the UE; means for transmitting the retransmission to the UE based at least in part on receiving the instruction; and/or the like. In some aspects, such means may include one or more components of base station 110 described in connection with FIG. 2.

As indicated above, FIG. 2 is provided merely as an example. Other examples may differ from what is described with regard to FIG. 2.

Figure 3A:
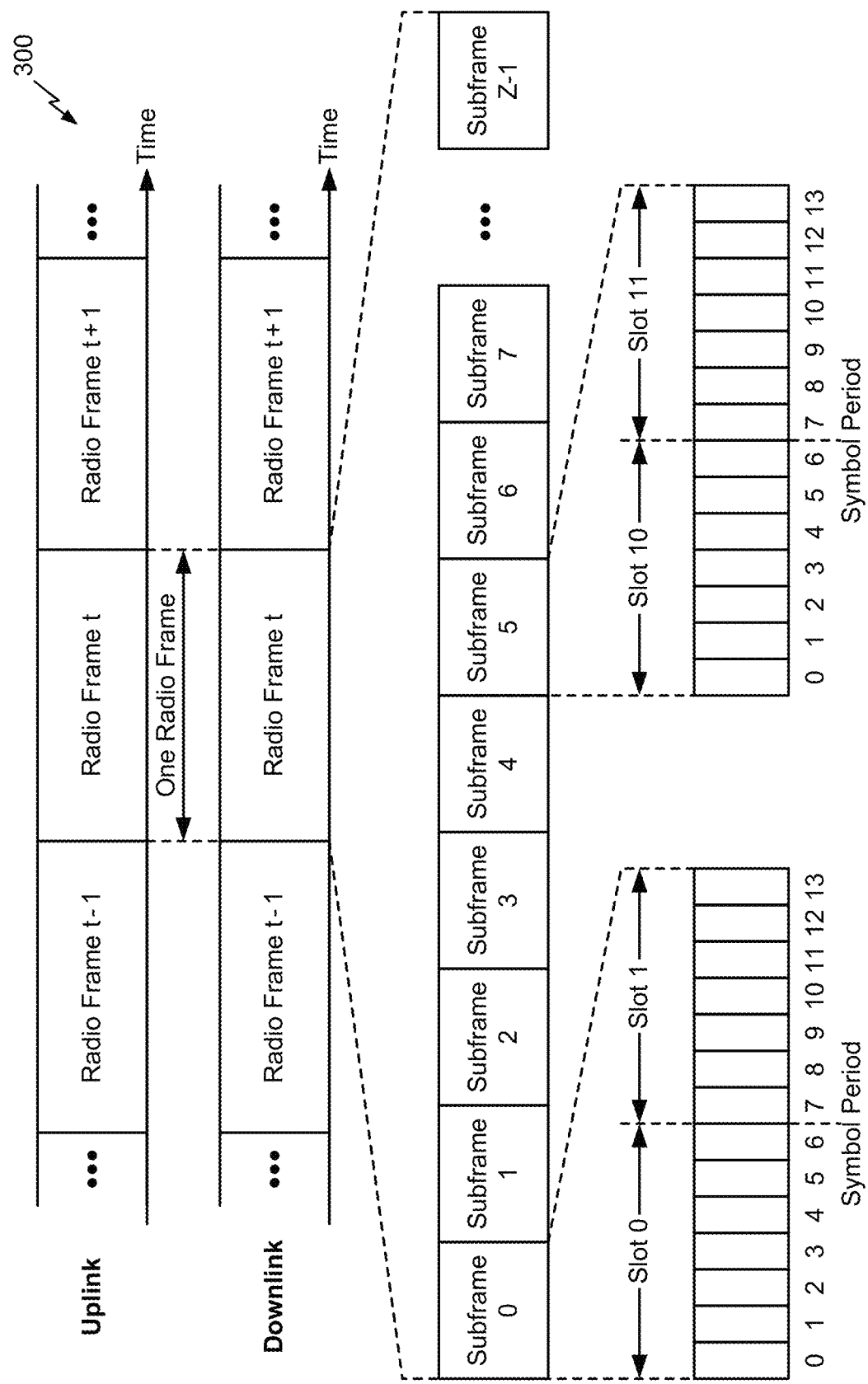
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z ($Z \geq 1$) subframes (e.g., with indices of 0 through Z-1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L-1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
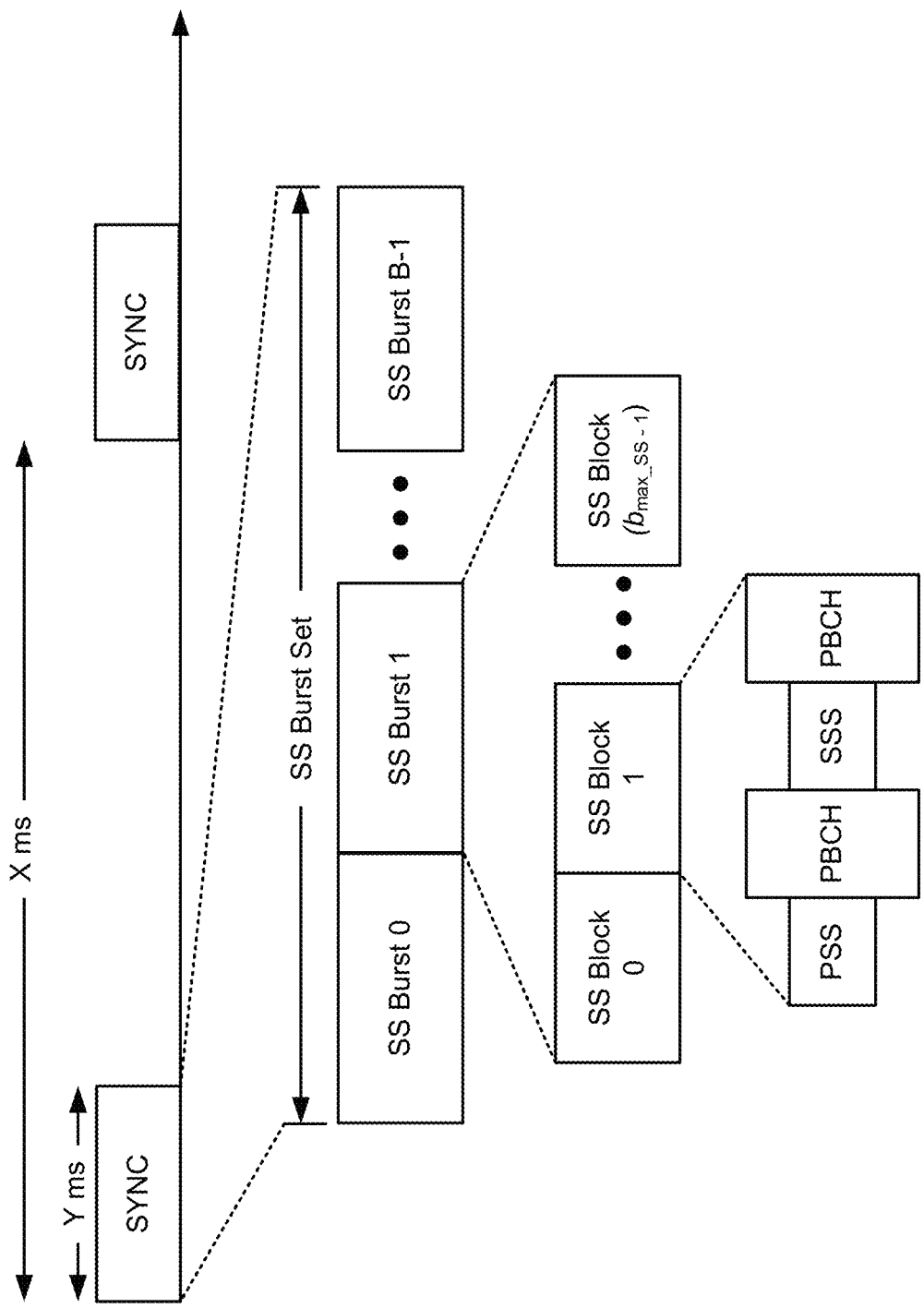
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples may differ from what is described with regard to FIGS. 3A and 3B.

Figure 4:
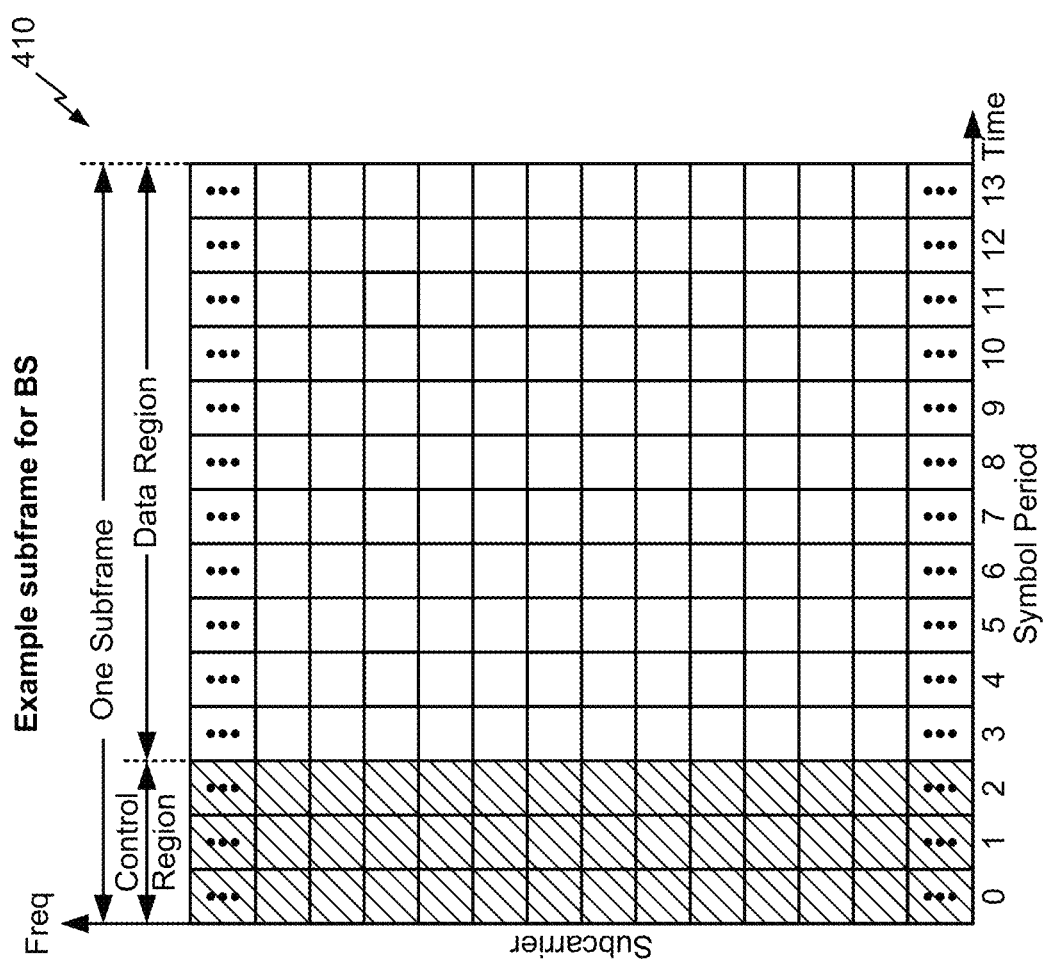
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, and/or may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, and/or may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra-reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
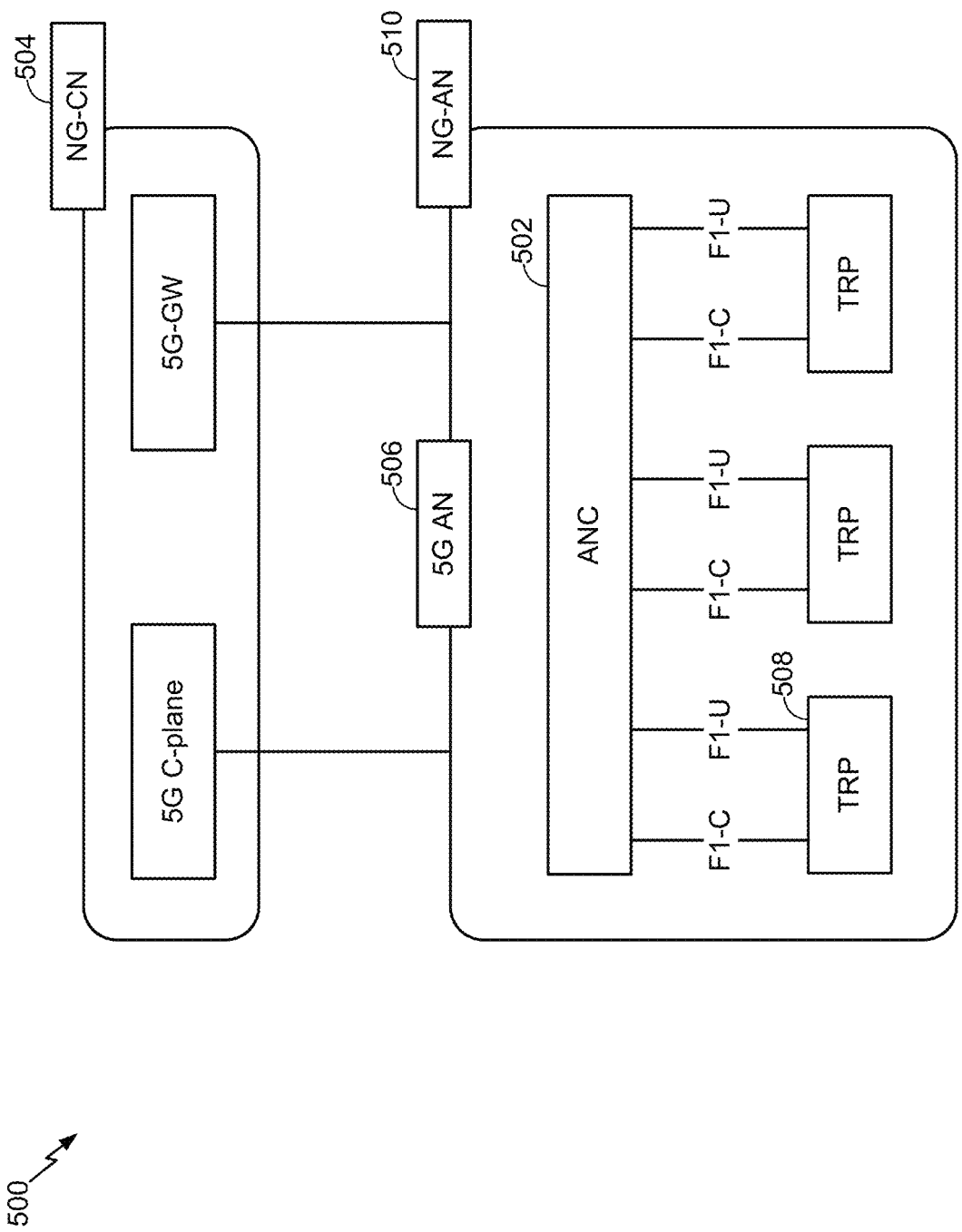
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, "TRP" may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP. The ANC 502 and the TRP 508 may communicate via a control plane interface, shown as F1-C, and/or via a data plane interface, shown as F1-U.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what is described with regard to FIG. 5.

Figure 6:
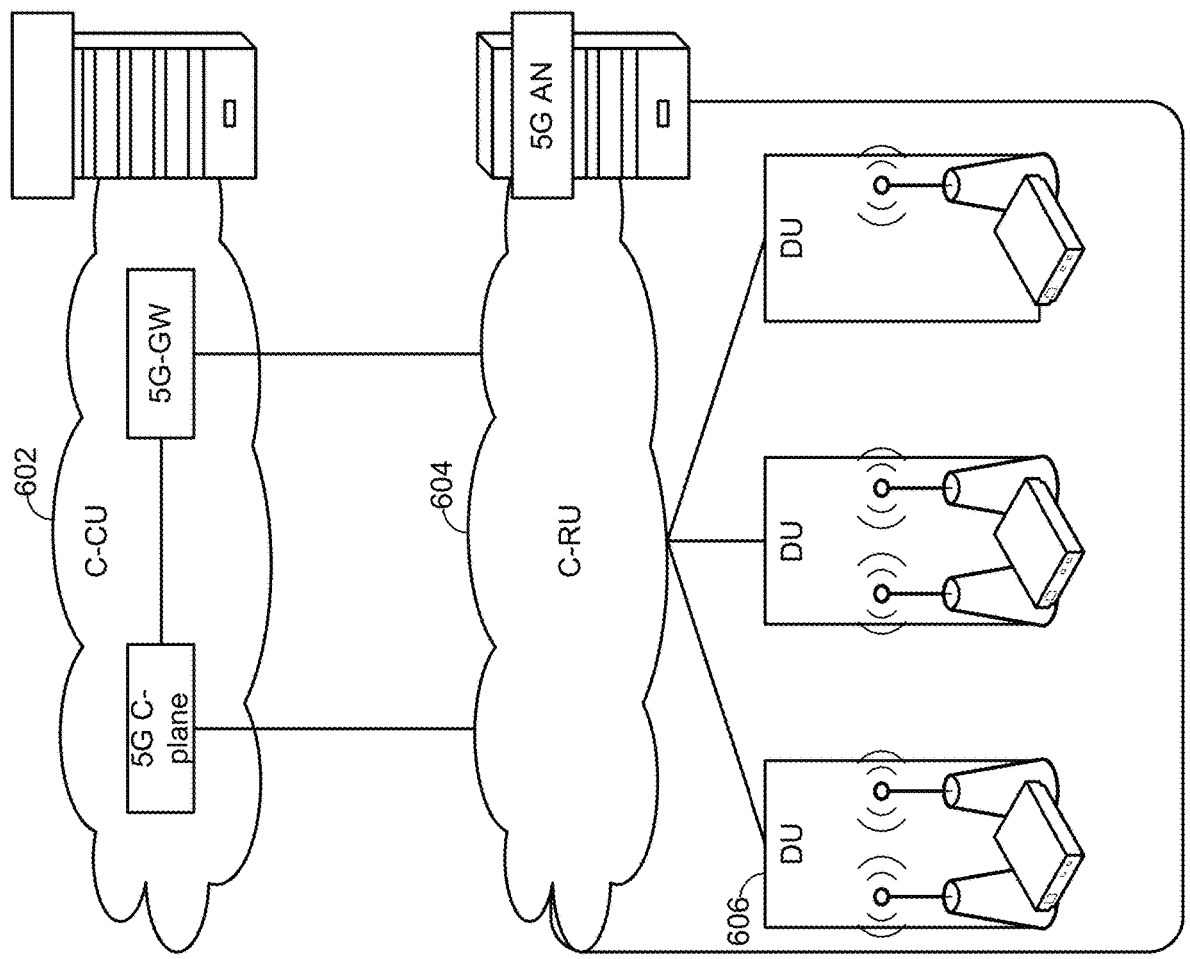
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples may differ from what is described with regard to FIG. 6.

Figure 7:
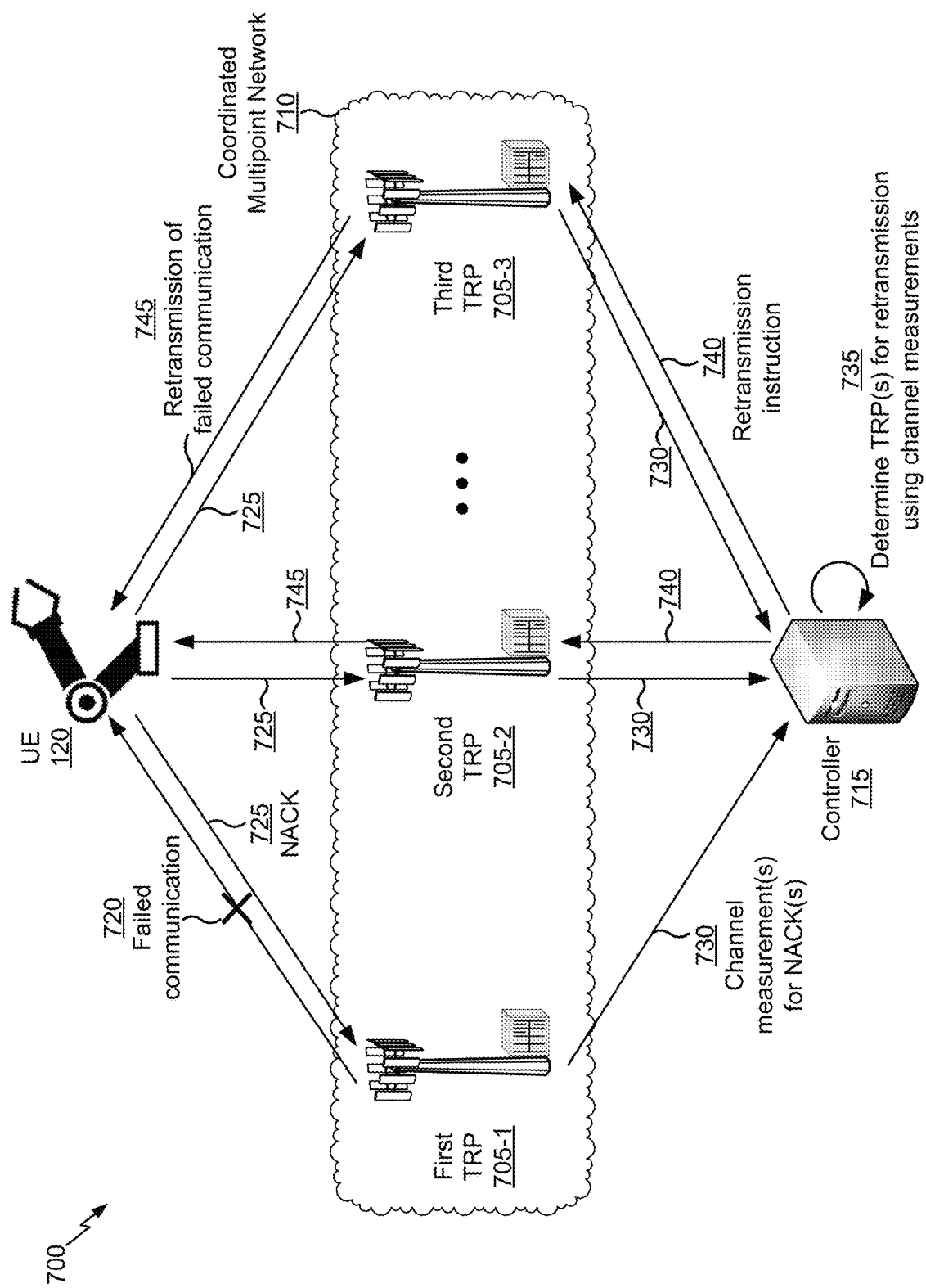
FIGS. 7-9 are diagrams illustrating examples of TRP selection for retransmissions in a coordinated multipoint network, in accordance with various aspects of the present disclosure.

FIG. 7 is a diagram illustrating an example 700 of TRP selection for retransmissions in a coordinated multipoint network, in accordance with various aspects of the present disclosure.

As shown in FIG. 7, a UE 120 (e.g., an MTC UE and/or the like, shown as a robotic arm) may be capable of communicating with multiple TRPs 705 (e.g., a base station 110, an antenna 234 of base station 110, a TRP 508, a DU 606, and/or the like), shown as a first TRP 705-1, a second TRP 705-2, and a third TRP 705-3. The multiple TRPs 705 may be included in a coordinated multipoint network 710. The coordinated multipoint network 710 may be used to send information to the UE 120 and/or receive information from the UE 120 via multiple TRPs 705 to improve performance (e.g., in case of dynamic network conditions, poor network conditions, and/or the like).

In some aspects, all of the TRPs 705 in the coordinated multipoint network 710 may use the same frequency band for communication (e.g., the coordinated multipoint network 710 may be a "reuse 1" network). In some aspects, at least two TRPs 705 in the coordinated multipoint network 710 may use different frequency bands for communication. For example, the coordinated multipoint network 710 may be a frequency reuse network (e.g., may employ frequency reuse across TRPs 705), where different TRPs 705 reuse frequency bands, but adjacent TRPs 705 may use different frequency bands to mitigate interference. In this case, at least two of the first TRP 705-1, the second TRP 705-2, or the third TRP 705-3 may be adjacent TRPs 705 or may otherwise use different frequency bands for communication (e.g., according to a frequency reuse pattern employed by the coordinated multipoint network 710). Although the coordinated multipoint network 710 of FIG. 7 shows three TRPs 705, in practice, the coordinated multipoint network 710 may include two TRPs 705 or more than three TRPs 705.

The TRPs 705 in the coordinated multipoint network 710 may use coordinated scheduling and/or coordinated beamforming to improve performance. In coordinated scheduling, the TRPs 705 may communicate with a controller 715 (e.g., a network controller 130, a controller/processor 240 of base station 110, an ANC 502, a C-RU 604, and/or the like), which may perform centralized scheduling for transmissions to a UE 120 (or multiple UEs 120) by multiple TRPs 705. The transmissions may be scheduled to occur at the same time (e.g., using the same frequency or different frequencies), or may be scheduled to occur at different times (e.g., using the same frequency or different frequencies), so as to improve reception by the UE 120. In some aspects, the TRPs 705 and the controller 715 may communicate using a local time sensitive network to reduce the latency of information exchanged between a TRP 705 and the controller 715. The local time sensitive network may be a wired network, a wireless network, or a network that includes both wired communication and wireless communication.

In some aspects, the controller 715 may instruct the TRPs 705 to transmit using joint transmission (JT), where multiple TRPs 705 transmit the same information to a UE 120 in the same time slot using coordinated beamforming (e.g., with appropriate beamforming weights applied to transmissions by different TRPs 705). In some aspects, the controller 715 may instruct the TRPs 705 to transmit using dynamic point selection (DPS), where a single TRP 705 transmits information to a UE 120 per time slot (e.g., using appropriate beamforming, which may be indicated to the TRP 705 by the controller 715), and where different TRPs 705 may be scheduled for transmission to the UE 120 in different time slots. This may improve performance by dynamically scheduling different TRPs 705 to transmit information to the UE 120 based at least in part on channel conditions, which may account for shadowing, channel fading, and/or the like.

However, in some settings, such as an industrial environment (e.g., a factory that uses factory automation for communication between machines), a channel condition referred to as fast shadowing may occur. In fast shadowing, channel conditions may change very quickly due to reflection and/or blockage of signals by machines that move rapidly (e.g., a mechanical arm, a robot, and/or the like), such as up to 20 meters per second, for example. Often, channel conditions in fast shadowing may change so rapidly (e.g., every 10 ms and/or the like) that re-association and/or handover to a different TRP 705, which may take approximately 65-90 ms, may not be fast enough to keep up with the change in channel conditions (e.g., channel conditions may change dramatically before handover is completed). In this case, transmissions by multiple TRPs 705 in a coordinated multipoint network 710 may be used to increase spatial diversity and improve reception of signals.

In some aspects, a hybrid automatic repeat request (HARQ) procedure may be used in a coordinated multipoint network 710 and/or in a setting where fast shadowing may occur. In this case, channel conditions may change rapidly, such that the TRP 705 that transmits a failed communication to a UE 120 (e.g., a communication for which the UE 120 responds with a negative acknowledgement, or NACK) may have poor channel conditions with the UE 120 after the NACK is received and a retransmission is to occur. In this case, one or more retransmissions may be transmitted by a different TRP 705 and/or by multiple TRPs 705 (e.g., including or excluding the original TRP 705 that transmitted the failed communication). Some techniques and apparatuses described herein permit selection of one or more TRPs 705 for retransmissions such that network performance is improved (e.g., to satisfy a latency requirement, a reliability requirement, a URLLC requirement, and/or the like), such as by selecting TRP(s) 705 with channel conditions that satisfy a threshold for communicating with a UE 120.

As shown by reference number 720, a communication from a first TRP 705-1 to the UE 120 may fail, and the UE 120 may determine that the communication has failed (e.g., was not successfully received). For example, the UE 120 may receive the communication (e.g., a packet and/or the like), and may be unable to decode the communication, may detect an error after decoding the communication (e.g., after performing a cyclic redundancy check), and/or the like.

As shown by reference number 725, the UE 120 may transmit multiple negative acknowledgements (NACKs) corresponding to the failed communication based at least in part on determining that the communication was not successfully received. As shown, in some aspects, the UE 120 may transmit the NACKs to multiple TRPs 705, such as the first TRP 705-1, the second TRP 705-2, and the third TRP 705-3. In some aspects, the UE 120 may transmit a NACK to a TRP 705 other than the TRP 705 from which the failed communication was received. For example, the second TRP 705-2 and the third TRP 705-3 may each receive a NACK from the UE 120, and that NACK may correspond to the failed communication transmitted by the first TRP 705-1.

As described in more detail below in connection with FIG. 8, in some aspects, the TRPs 705 in the coordinated multipoint network 710 may use a same frequency band for communication. In this case, the UE 120 may transmit the multiple NACKs by distributing the multiple NACKs over a bandwidth, such as a system bandwidth, a wideband bandwidth, a narrowband bandwidth, and/or the like.

As described in more detail below in connection with FIG. 9, in some aspects, at least two TRPs 705 (e.g., adjacent TRPs 705) in the coordinated multipoint network 710 may use different frequency bands for communication. In this case, different TRPs 705 may be assigned different resource block subsets for communication (e.g., different frequencies), and the UE 120 may transmit different NACKs, of the multiple NACKs, on different resource block subsets.

As shown by reference number 730, each TRP 705 that receives a NACK may determine one or more channel measurements of one or more channels for communication with the UE 120, and may transmit the channel measurement(s) to the controller 715. A channel measurement may include, for example, a measurement of a channel parameter relating to signal power and/or signal quality, such as a reference signal received power (RSRP) parameter, a reference signal received quality (RSRQ) parameter, a received signal strength indicator (RSSI), a signal-to-interference plus noise ratio (SINR), and/or the like. In some aspects, a TRP 705 may determine a channel measurement based at least in part on a NACK. For example, a TRP 705 may perform channel estimation on a received NACK sequence.

As shown by reference number 735, after receiving the channel measurements from the TRPs 705, the controller 715 may determine one or more TRPs for a retransmission of the failed communication based at least in part on the plurality of channel measurements. For example, the controller 715 may analyze and/or compare the channel measurements to identify the best set of channels (e.g., among all TRPs 705), a set of channels with channel measurements that satisfy a threshold, and/or the like. The controller 715 may select the TRP(s) 705, associated with the identified set of channels, for retransmission of the failed communication. In some aspects, the controller 715 may select a single TRP 705 for retransmission to conserve network resources. In some aspects, the controller 715 may select multiple TRPs 705 for retransmission (e.g., the TRPs 705 with the best channel measurements as compared to other TRPs 705, all TRPs 705 with channel measurements that satisfy a threshold, and/or the like), thereby improving spatial diversity and increasing the likelihood of reception of the retransmission(s) by the UE 120.

As shown by reference number 740, the controller 715 may instruct the one or more TRPs 705 selected for retransmission to transmit the retransmission to the UE 120. In some aspects, if a TRP 705 is capable of transmitting on multiple channels, the controller 715 may indicate a channel via which the TRP 705 is to transmit a retransmission. In some aspects, the TRP 705 may determine which channel to use for the retransmission based at least in part on the channel measurements performed by the TRP 705 (e.g., by selecting the best channel as compared to other channels). Additionally, or alternatively, the controller 715 may indicate the UE 120 to which the retransmission is to be transmitted (e.g., using a UE identifier). Additionally, or alternatively, the controller 715 may indicate one or more beamforming parameters and/or precoding parameters to be used by a TRP 705 for the retransmission to the UE 120. Additionally, or alternatively, the controller 715 may indicate a timing for the retransmission(s) to the UE 120 (e.g., a transmission time interval (TTI), such as a slot, in which a retransmission is to be transmitted).

In some aspects, the controller 715 may instruct the selected TRPs 705 to transmit using joint transmission, where multiple TRPs 705 transmit the same information to a UE 120 in the same time slot using coordinated beamforming (e.g., with appropriate beamforming weights applied to transmissions by different TRPs 705). In this case, the controller 715 may determine the beamforming weights (e.g., based at least in part on the channel measurements), and may indicate the beamforming weights to the selected TRPs 705 to be used for retransmission using coordinated beamforming. Additionally, or alternatively, the controller 715 may indicate the time slot in which all selected TRPs 705 are to transmit retransmissions.

In some aspects, the controller 715 may instruct the selected TRPs 705 to transmit using dynamic point selection, where only one TRP 705 transmits information to a UE 120 per time slot (e.g., using appropriate beamforming, which may be indicated to the TRP 705 by the controller 715), and where different TRPs 705 may be scheduled for transmission to the UE 120 in different time slots. In this case, the controller 715 may indicate different time slots for retransmission to different TRPs 705 for coordinate scheduling.

As shown, in some aspects, the controller 715 may select fewer than all of the TRPs 705 for retransmission, and/or may select a TRP 705 other than the TRP 705 that transmitted the failed communication. For example, in FIG. 7, the controller 715 selects the second TRP 705-2 and the third TRP 705-3 for retransmission, and transmits a retransmission instruction to the second TRP 705-2 and the third TRP 705-3 (e.g., without transmitting a retransmission instruction to the first TRP 705-1). Although shown as selecting multiple TRPs 705, in some aspects, the controller 715 may select a single TRP 705. Additionally, or alternatively, although shown as selecting TRPs 705 other than the TRP 705 that transmitted the failed communication, in some aspects, the controller 715 may select the TRP 705 that transmitted the failed communication.

As shown by reference number 745, a TRP 705 may transmit a retransmission to the UE 120 based at least in part on receiving an instruction from the controller 715 to transmit the retransmission of the failed communication to the UE 120. For example, in FIG. 7, the second TRP 705-2 and the third TRP 705-3 transmit a retransmission to the UE 120, while the first TRP 705-1 does not. In some aspects, the TRP(s) 705 may identify the UE 120, may determine one or more beamforming parameters, may determine one or more precoding parameters, may identify a timing for the retransmission, and/or the like based at least in part on information received from the controller 715.

As described in more detail below in connection with FIG. 9, in some aspects, at least two TRPs 705 (e.g., adjacent TRPs 705), in the coordinated multipoint network 710, may use different frequency bands for communication. In this case, different TRPs 705 may be assigned different resource block subsets for communication (e.g., different frequencies), and may transmit respective retransmissions using different resource block subsets. If multiple TRPs 705 transmit a retransmission, then the UE 120 may receive retransmissions from different TRPs 705 on different resource block sets allocated to the different TRPs 705. If a single TRP 705 transmits a retransmission, then the UE 120 may receive the retransmission via a single resource block set allocated to that single TRP 705.

The UE 120 may receive the retransmission(s) from the one or more TRPs 705 selected by the controller 715, and may decode the retransmission(s) (e.g., using chase decoding, incremental redundancy, and/or the like). In some aspects, if the UE 120 receives multiple retransmissions (e.g., from different TRPs 705), then the UE 120 may decode the multiple retransmissions to recover the failed communication. For example, multiple TRPs 705 may use joint transmission to transmit the retransmissions using appropriate beamforming weights and/or co-phasing (e.g., using coherent joint transmission), and the UE 120 may decode such retransmissions.

Although example 700 shows the UE 120 receiving retransmissions from TRPs 705 (e.g., the second TRP 705-2 and the third TRP 705-3) other than the TRP 705 that transmitted the failed communication (e.g., the first TRP 705-1), in some aspects, the UE 120 may receive a retransmission from the TRP 705 that transmitted the failed communication (e.g., if the controller 715 were to select the first TRP 705-1). Furthermore, although example 700 shows the UE 120 receiving retransmissions from multiple TRPs 705, in some aspects, the UE 120 may receive a retransmission from a single TRP 705 (e.g., if the controller 715 were to select a single TRP 705 for retransmission).

Due to spatial diversity gains achieved by receiving retransmissions from multiple TRPs 705 and/or a different TRP 705 than the TRP 705 that transmitted the failed communication, a likelihood of the UE 120 successfully receiving a retransmission may be improved, particularly in an environment with rapidly changing channel conditions. Furthermore, due to selection of one or more TRPs 705 and/or channels associated with good channel measurements, a likelihood of the UE 120 successfully receiving a retransmission may be further improved. In this way, a likelihood of satisfying a quality of service requirement, such as a high reliability requirement, a low latency requirement, a URLLC requirement, and/or the like, may be improved.

As indicated above, FIG. 7 is provided as an example. Other examples may differ from what is described with respect to FIG. 7.

Figure 8:
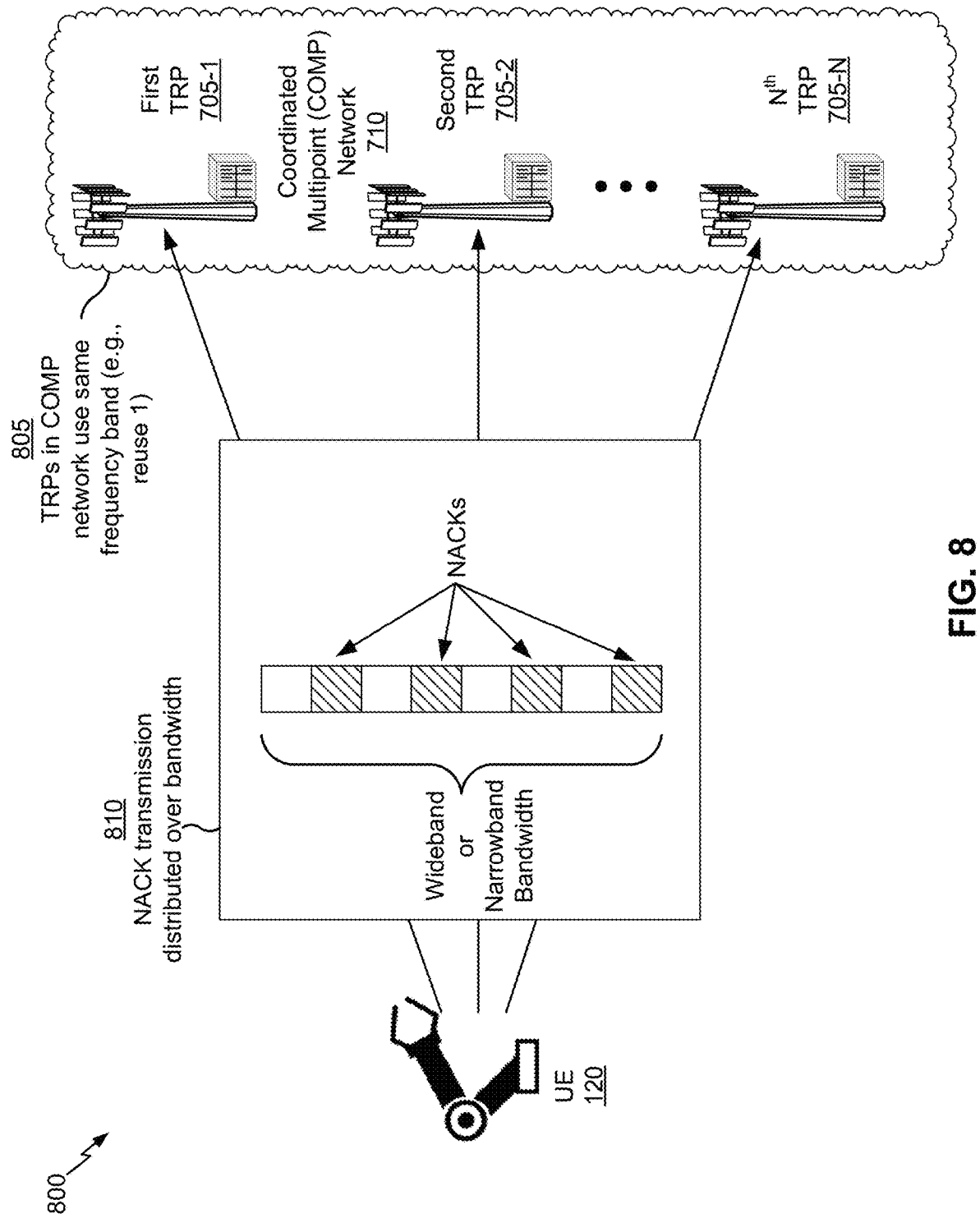

FIG. 8 is a diagram illustrating another example 800 of TRP selection for retransmissions in a coordinated multipoint network, in accordance with various aspects of the present disclosure.

As shown by reference number 805, in some aspects, all of the TRPs 705 in a coordinated multipoint network 710 may use a same frequency band for communication (e.g., the coordinated multipoint network 710 may be a "reuse 1" network, with a frequency reuse factor of 1).

As shown by reference number 810, if all of the TRPs 705 in the coordinated multipoint network 710 use the same frequency band, then the UE 120 may transmit the multiple NACKs (e.g., as described above in connection with FIG. 7) by distributing the multiple NACKS over a bandwidth. In some aspects, the UE 120 may distribute the NACKs over a wideband bandwidth, such as an entire system bandwidth used by the TRPs 705 in the coordinated multipoint network 710. For example, the NACKs may be distributed over different channels (e.g., different frequencies) in the wideband bandwidth.

In some aspects, the UE 120 may distribute the NACKs over a narrowband bandwidth, such as a portion of a system bandwidth used by the TRPs 705 in the coordinated multipoint network 710. For example, the NACKs may be distributed over different channels (e.g., different frequencies) in the narrowband bandwidth. In this case, the NACKs may be spaced more closely in frequency than if the NACKs were transmitted via the wideband bandwidth, and this arrangement may reduce or eliminate interpolation by the TRPs 705 when performing channel estimation. In some aspects, the narrowband may be allocated and/or reserved for transmission of acknowledgements (ACKs) or NACKs, and/or may be allocated for retransmissions.

In some aspects, each TRP 705 may receive multiple NACKs in different channels, may obtain channel measurements for the channels, and may report the channel measurements to a controller 715, as described above in connection with FIG. 7. The controller 715 may determine a set of channels via which retransmissions are to be transmitted based at least in part on the channel measurements, may determine a set of TRPs 705 associated with the set of channels, and may instruct the set of TRPs 705 to transmit retransmissions. In some aspects, the controller 715 may indicate a channel via which a TRP 705 is to transmit a retransmission. Alternatively, a TRP 705 may determine the channel based at least in part on the channel measurements performed by that TRP 705.

In some aspects, the controller 715 may instruct multiple TRPs 705 to transmit retransmissions using joint transmission, such as coherent joint transmission with co-phasing of retransmissions. In this case, the controller 715 may indicate one or more parameters to be used for the joint transmission (e.g., a timing of the joint transmission, beamforming parameters to be used for co-phasing, and/or the like). In this way, a likelihood of the UE 120 receiving the retransmissions may be increased, as described elsewhere herein.

As indicated above, FIG. 8 is provided as an example. Other examples may differ from what is described with respect to FIG. 8.

Figure 9:
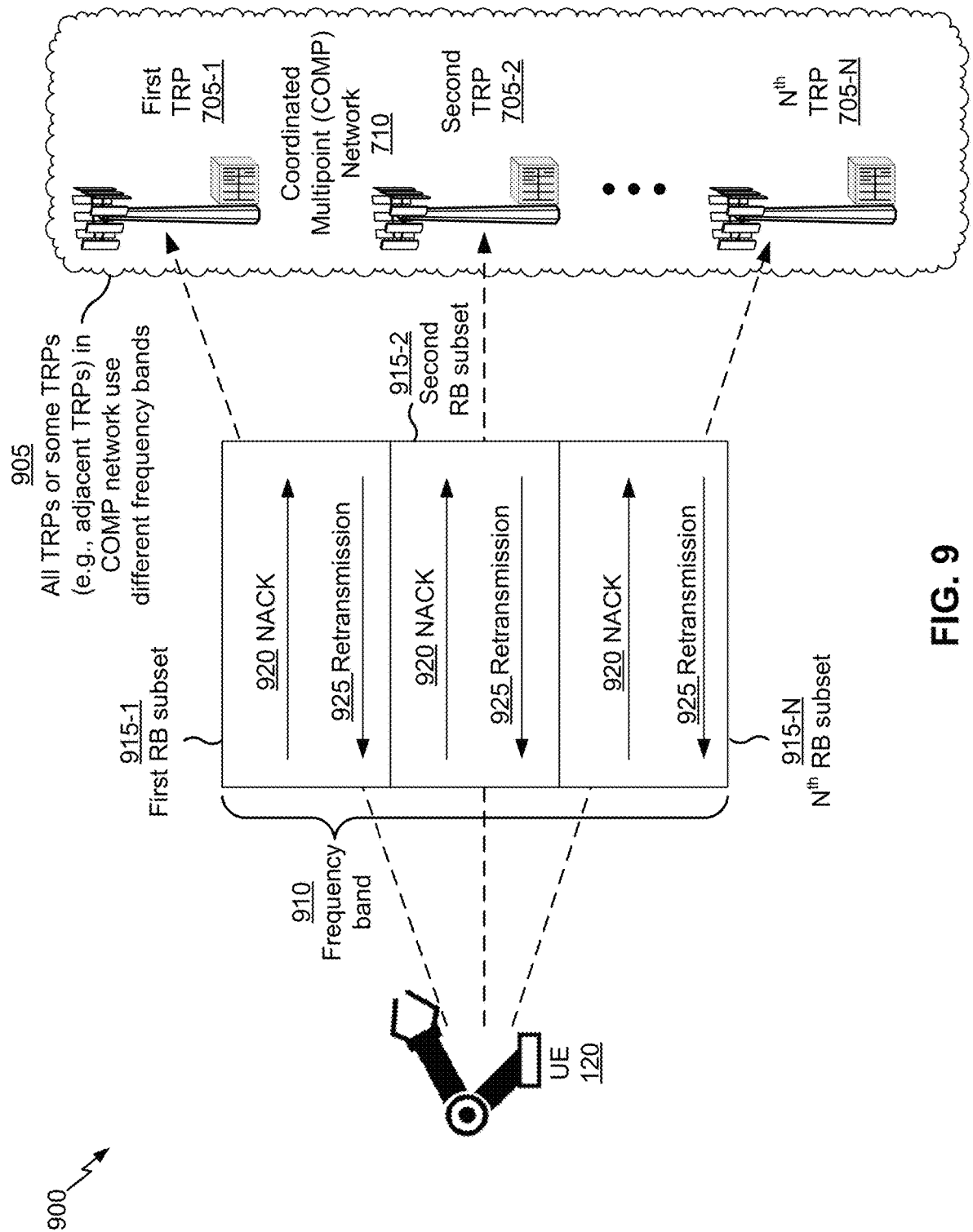

FIG. 9 is a diagram illustrating another example 900 of TRP selection for retransmissions in a coordinated multipoint network, in accordance with various aspects of the present disclosure.

As shown by reference number 905, in some aspects, at least two TRPs 705 (e.g., adjacent TRPs 705), in the coordinated multipoint network 710, may use different frequency bands for communication (e.g., the coordinated multipoint network 710 may be a network other than a "reuse 1" network, and may have a frequency reuse factor other than 1, such as 2, 3, 4, and/or the like). In this case, different TRPs 705 may be assigned different resource block subsets (e.g., different frequency band subsets of a system bandwidth) for communication. For example, the system bandwidth may span a frequency band 910, and different TRPs may be allocated with different resource block subsets 915 of the frequency band 910. In example 900, a first TRP 705-1 is allocated a first resource block subset 915-1, a second TRP 705-2 is allocated a second resource block subset 915-2, and an $N^{th}$ TRP 705-N is allocated an $N^{th}$ resource block subset 915-N.

As shown by reference number 920, if some TRPs 705 in the coordinated multipoint network 710 use different frequency bands, then the UE 120 may transmit the multiple NACKs (e.g., as described above in connection with FIG. 7) by transmitting different NACKs, of the multiple NACKs, on different resource block subsets 915. For example, the UE 120 may transmit a first NACK to the first TRP 705-1 using the first resource block subset 915-1, may transmit a second NACK to the second TRP 705-2 using the second resource block subset 915-2, may transmit an $N^{th}$ NACK to the $N^{th}$ TRP 705-N using the $N^{th}$ resource block subset 915-N, and/or the like.

As shown by reference number 925, if some TRPs 705 in the coordinated multipoint network 710 use different frequency bands, then the UE 120 may receive the multiple retransmissions (e.g., as described above in connection with FIG. 7) by receiving different retransmissions, of the multiple retransmissions, on different resource block subsets 915. For example, the UE 120 may receive first retransmissions from the first TRP 705-1 via the first resource block subset 915-1, may receive second retransmissions from the second TRP 705-2 via the second resource block subset 915-2, may receive $N^{th}$ retransmissions from the $N^{th}$ TRP 705-N via the $N^{th}$ resource block subset 915-N, and/or the like. In this way, a likelihood of the UE 120 receiving the retransmissions may be increased, as described elsewhere herein.

As indicated above, FIG. 9 is provided as an example. Other examples may differ from what is described with respect to FIG. 9.

Figure 10:
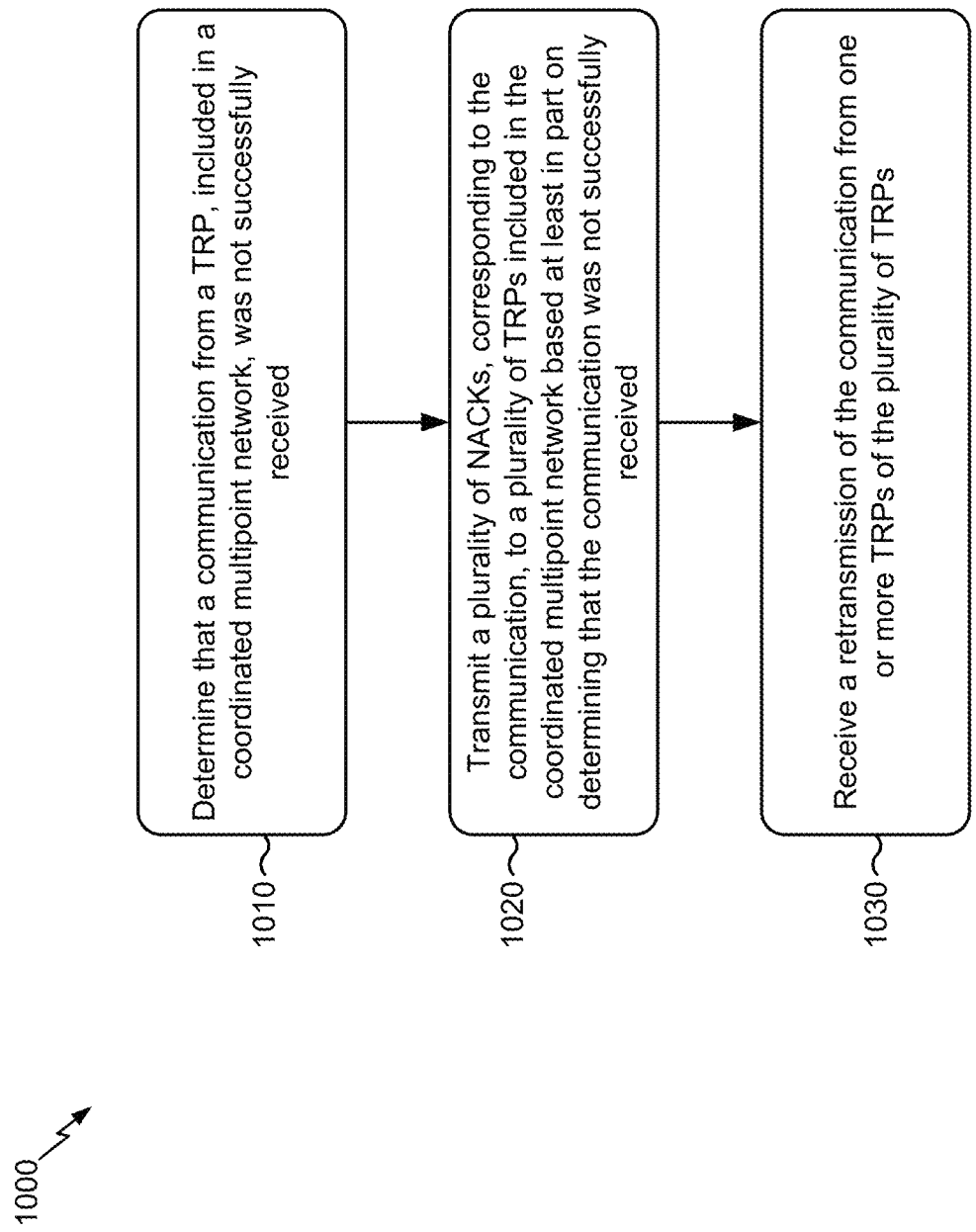

FIG. 10 is a diagram illustrating an example process 1000 performed, for example, by a UE, in accordance with various aspects of the present disclosure. Example process 1000 is an example where a UE (e.g., UE 120 and/or the like) performs operations to assist with TRP selection for retransmissions in a coordinated multipoint network.

As shown in FIG. 10, in some aspects, process 1000 may include determining that a communication from a TRP, included in a coordinated multipoint network, was not successfully received (block 1010). For example, the UE may determine (e.g., using controller/processor 280 and/or the like) that a communication from a TRP, included in a coordinated multipoint network, was not successfully received, as described above in connection with FIGS. 7-9.

As further shown in FIG. 10, in some aspects, process 1000 may include transmitting a plurality of NACKs, corresponding to the communication, to a plurality of TRPs included in the coordinated multipoint network based at least in part on determining that the communication was not successfully received (block 1020). For example, the UE may transmit (e.g., using controller/processor 280, transmit processor 264, TX MIMO processor 266, MOD 254, antenna 252, and/or the like) a plurality of NACKs, corresponding to the communication, to a plurality of TRPs included in the coordinated multipoint network based at least in part on determining that the communication was not successfully received, as described above in connection with FIGS. 7-9.

As further shown in FIG. 10, in some aspects, process 1000 may include receiving a retransmission of the communication from one or more TRPs of the plurality of TRPs (block 1030). For example, the UE may receive (e.g., using antenna 252, DEMOD 254, MIMO detector 256, receive processor 258, controller/processor 280, and/or the like) a retransmission of the communication from one or more TRPs of the plurality of TRPs, as described above in connection with FIGS. 7-9.

Process 1000 may include additional aspects, such as any single aspect or any combination of aspects described below and/or in connection with one or more other processes described herein.

In some aspects, the one or more TRPs includes the TRP from which the communication was not successfully received. In some aspects, the one or more TRPs does not include the TRP from which the communication was not successfully received. In some aspects, the one or more TRPs includes multiple TRPs.

In some aspects, the plurality of TRPs use a same frequency band for communication. In some aspects, the plurality of NACKs are distributed over at least one of a wideband channel or a narrowband channel. In some aspects, at least two TRPs, of the plurality of TRPs, use different frequency bands for communication. In some aspects, the plurality of NACKs are transmitted via a plurality of resource block subsets, wherein different resource block subsets, of the plurality of resource block subsets, are allocated to different TRPs of the plurality of TRPs. In some aspects, the retransmission is received via a single resource block subset allocated to a single TRP of the one or more TRPs. In some aspects, the retransmission is received via multiple resource block subsets allocated to multiple TRPs of the one or more TRPs.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
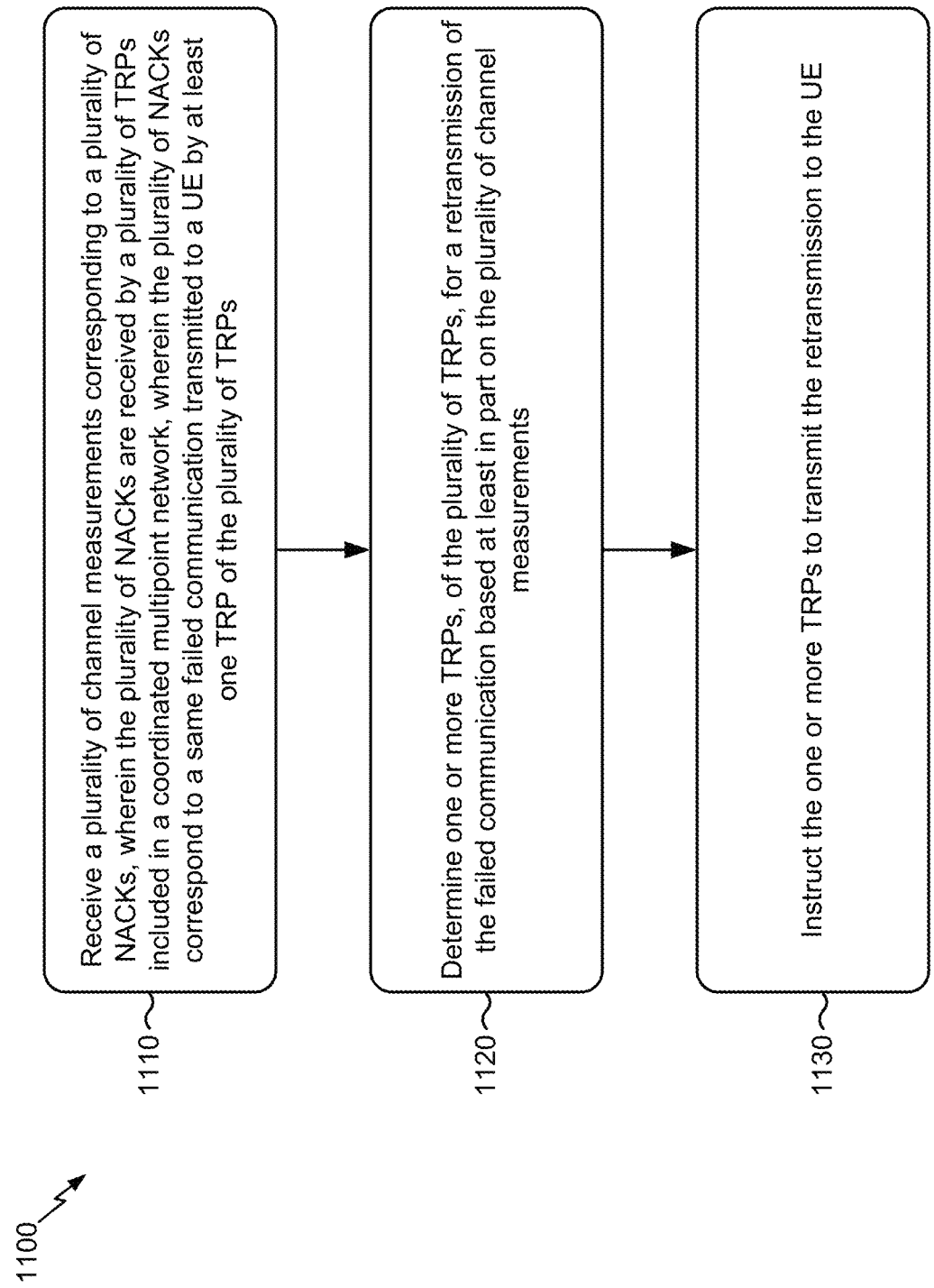

FIG. 11 is a diagram illustrating an example process 1100 performed, for example, by a controller, in accordance with various aspects of the present disclosure. Example process 1100 is an example where a controller (e.g., controller 715 and/or the like) performs TRP selection for retransmissions in a coordinated multipoint network.

As shown in FIG. 11, in some aspects, process 1100 may include receiving a plurality of channel measurements corresponding to a plurality of NACKs, wherein the plurality of NACKs are received by a plurality of TRPs included in a coordinated multipoint network, wherein the plurality of NACKs correspond to a same failed communication transmitted to a UE by at least one TRP of the plurality of TRPs (block 1110). For example, the controller may receive (e.g., using antenna 234, DEMOD 232, MIMO detector 236, receive processor 238, controller/processor 240, controller processor 290, communication unit 294, and/or the like) a plurality of channel measurements corresponding to a plurality of NACKs, as described above in connection with FIGS. 7-9. In some aspects, the plurality of NACKs are received by a plurality of TRPs included in a coordinated multipoint network. In some aspects, the plurality of NACKs correspond to a same failed communication transmitted to a UE by at least one TRP of the plurality of TRPs.

As further shown in FIG. 11, in some aspects, process 1100 may include determining one or more TRPs, of the plurality of TRPs, for a retransmission of the failed communication based at least in part on the plurality of channel measurements (block 1120). For example, the controller may determine (e.g., using controller/processor 240, controller/processor 290, and/or the like) one or more TRPs, of the plurality of TRPs, for a retransmission of the failed communication based at least in part on the plurality of channel measurements, as described above in connection with FIGS. 7-9.

As further shown in FIG. 11, in some aspects, process 1100 may include instructing the one or more TRPs to transmit the retransmission to the UE (block 1130). For example, the controller may instruct (e.g., using controller/processor 290, communication unit 294, controller/processor 240, transmit processor 220, TX MIMO processor 230, MOD 232, antenna 234, and/or the like) the one or more TRPs to transmit the retransmission to the UE, as described above in connection with FIGS. 7-9.

Process 1100 may include additional aspects, such as any single aspect or any combination of aspects described below and/or in connection with one or more other processes described herein.

In some aspects, the one or more TRPs includes the at least one TRP associated with the failed communication. In some aspects, the one or more TRPs does not include the at least one TRP associated with the failed communication. In some aspects, the one or more TRPs includes multiple TRPs.

In some aspects, the plurality of channel measurements is determined based at least in part on the plurality of NACKs. In some aspects, the controller is configured to receive the plurality of channel measurements from the plurality of TRPs. In some aspects, the one or more TRPs are instructed to transmit the retransmission using at least one of joint transmission or dynamic point selection. In some aspects, the plurality of TRPs and the controller communicate using a local time sensitive network.

In some aspects, the plurality of TRPs use a same frequency band for communication. In some aspects, the plurality of NACKs are distributed over at least one of a wideband channel or a narrowband channel. In some aspects, at least two TRPs, of the plurality of TRPs, use different frequency bands for communication. In some aspects, the plurality of NACKs are received via a plurality of resource block subsets, wherein different resource block subsets of the plurality of resource block subsets are allocated to different TRPs of the plurality of TRPs. In some aspects, the one or more TRPs are instructed to transmit the retransmission via a single resource block subset allocated to a single TRP of the one or more TRPs. In some aspects, the one or more TRPs are instructed to transmit the retransmission via multiple resource block subsets allocated to multiple TRPs of the one or more TRPs.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a diagram illustrating an example process 1200 performed, for example, by a TRP, in accordance with various aspects of the present disclosure. Example process 1200 is an example where a TRP (e.g., TRP 705 and/or the like) performs operations to assist with TRP selection for retransmissions in a coordinated multipoint network.

As shown in FIG. 12, in some aspects, process 1200 may include receiving a negative acknowledgement (NACK) corresponding to a failed communication transmitted to a user equipment (UE) by a different TRP included in the coordinated multipoint network (block 1210). For example, the TRP may receive (e.g., using antenna 234, DEMOD 232, MIMO detector 236, receive processor 238, controller/processor 240, and/or the like) a NACK corresponding to a failed communication transmitted to a UE by a different TRP included in the coordinated multipoint network, as described above in connection with FIGS. 7-9.

As further shown in FIG. 12, in some aspects, process 1200 may include transmitting a channel measurement to a controller, wherein the channel measurement is determined based at least in part on the NACK (block 1220). For example, the TRP may transmit (e.g., using controller/processor 240, transmit processor 220, TX MIMO processor 230, MOD 232, antenna 234, communication unit 244, and/or the like) a channel measurement to a controller, wherein the channel measurement is determined based at least in part on the NACK, as described above in connection with FIGS. 7-9.

As further shown in FIG. 12, in some aspects, process 1200 may include receiving an instruction from the controller to transmit a retransmission of the failed communication to the UE (block 1230). For example, the TRP may receive (e.g., using antenna 234, DEMOD 232, MIMO detector 236, receive processor 238, controller/processor 240, communication unit 244, and/or the like) an instruction from the controller to transmit a retransmission of the failed communication to the UE, as described above in connection with FIGS. 7-9.

As further shown in FIG. 12, in some aspects, process 1200 may include transmitting the retransmission to the UE based at least in part on receiving the instruction (block 1240). For example, the TRP may transmit (e.g., using controller/processor 240, transmit processor 220, TX MIMO processor 230, MOD 232, antenna 234, and/or the like) the retransmission to the UE based at least in part on receiving the instruction, as described above in connection with FIGS. 7-9.

Process 1200 may include additional aspects, such as any single aspect or any combination of aspects described below and/or in connection with one or more other processes described herein.

In some aspects, the TRP and the different TRP use a same frequency band for communication. In some aspects, the TRP and the different TRP use different frequency bands for communication.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a "processor" is implemented in hardware, firmware, and/or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining that a communication from a transmission/reception point (TRP), included in a coordinated multipoint network, was not successfully received;
   transmitting a plurality of negative acknowledgements (NACKs), corresponding to the communication, to a plurality of TRPs included in the coordinated multipoint network based at least in part on determining that the communication was not successfully received; and
   receiving a retransmission of the communication from one or more TRPs of the plurality of TRPs, wherein the one or more TRPs does not include the TRP from which the communication was not successfully received.

2. The method of claim 1, wherein the one or more TRPs includes multiple TRPs.

3. The method of claim 1, wherein the plurality of TRPs use a same frequency band for communication.

4. The method of claim 1, wherein at least two TRPs, of the plurality of TRPs, use different frequency bands for communication.

5. The method of claim 1, wherein the plurality of NACKs are distributed over at least one of:
   a wideband channel, or
   a narrowband channel.

6. The method of claim 1, wherein the plurality of NACKs are transmitted via a plurality of resource block subsets, wherein different resource block subsets, of the plurality of resource block subsets, are allocated to different TRPs of the plurality of TRPs.

7. The method of claim 1, wherein the retransmission is received via a single resource block subset allocated to a single TRP of the one or more TRPs.

8. The method of claim 1, wherein the retransmission is received via multiple resource block subsets allocated to multiple TRPs of the one or more TRPs.

9. A method of wireless communication performed by a controller, comprising:
   receiving a plurality of channel measurements corresponding to a plurality of negative acknowledgements (NACKs), wherein the plurality of NACKs are received by a plurality of transmission/reception points (TRPs) included in a coordinated multipoint network, wherein the plurality of NACKs correspond to a same failed communication transmitted to a user equipment (UE) by at least one TRP of the plurality of TRPs;
   determining one or more TRPs, of the plurality of TRPs, for a retransmission of the failed communication based at least in part on the plurality of channel measurements, wherein the one or more TRPs does not include the at least one TRP; and
   instructing the one or more TRPs to transmit the retransmission to the UE.

10. The method of claim 9, wherein the one or more TRPs includes multiple TRPs.

11. The method of claim 9, wherein the plurality of channel measurements is:
   determined by the controller based at least in part on the plurality of NACKs,
   received from the plurality of TRPs, or
   a combination thereof.

12. The method of claim 9, wherein the one or more TRPs are instructed to transmit the retransmission using at least one of joint transmission or dynamic point selection.

13. The method of claim 9, wherein the plurality of TRPs and the controller communicate using a local time sensitive network.

14. The method of claim 9, wherein the plurality of TRPs use a same frequency band for communication.

15. The method of claim 9, wherein at least two TRPs, of the plurality of TRPs, use different frequency bands for communication.

16. The method of claim 9, wherein the plurality of NACKs are:
   distributed over a wideband channel,
   distributed over a narrowband channel,
   received via a plurality of resource block subsets, wherein different resource block subsets of the plurality of resource block subsets are allocated to different TRPs of the plurality of TRPs, or
   a combination thereof.

17. The method of claim 9, wherein the one or more TRPs are instructed to:
   transmit the retransmission via a single resource block subset allocated to a single TRP of the one or more TRPs, or
   transmit the retransmission via multiple resource block sub sets allocated to multiple TRPs of the one or more TRPs.

18. A method of wireless communication performed by a transmission/reception point (TRP) included in a coordinated multipoint network, comprising:
   receiving a negative acknowledgement (NACK) corresponding to a failed communication transmitted to a user equipment (UE) by a different TRP included in the coordinated multipoint network;
   transmitting a channel measurement to a controller, wherein the channel measurement is determined based at least in part on the NACK;
   receiving an instruction from the controller to transmit a retransmission of the failed communication to the UE; and
   transmitting the retransmission to the UE based at least in part on receiving the instruction.

19. The method of claim 18, wherein the TRP and the different TRP use a same frequency band for communication.

20. The method of claim 18, wherein the TRP and the different TRP use different frequency bands for communication.

21. A user equipment (UE) for wireless communication, comprising:
   memory; and
   one or more processors operatively coupled to the memory, the memory and the one or more processors configured to:
      determine that a communication from a transmission/reception point (TRP), included in a coordinated multipoint network, was not successfully received;
      transmit a plurality of negative acknowledgements (NACKs), corresponding to the communication, to a plurality of TRPs included in the coordinated multipoint network based at least in part on determining that the communication was not successfully received; and
      receive a retransmission of the communication from one or more TRPs of the plurality of TRPs, wherein the one or more TRPs does not include the TRP.

22. The UE of claim 21, wherein the one or more TRPs includes multiple TRPs.

23. The UE of claim 21, wherein the plurality of TRPs use a same frequency band for communication.

24. The UE of claim 21, wherein at least two TRPs, of the plurality of TRPs, use different frequency bands for communication.

25. The UE of claim 21, wherein the plurality of NACKs are:
   distributed over at least one of a wideband channel or a narrowband channel, or
   transmitted via a plurality of resource block subsets, wherein different resource block subsets, of the plurality of resource block subsets, are allocated to different TRPs of the plurality of TRPs.

26. The UE of claim 21, wherein the retransmission is received via:
   a single resource block subset allocated to a single TRP of the one or more TRPs, or
   multiple resource block subsets allocated to multiple TRPs of the one or more TRPs.

27. The method of claim 18, wherein transmitting the retransmission comprises:
   transmitting the retransmission using at least one of joint transmission or dynamic point selection.

28. The method of claim 18, wherein the TRP and the controller communicate using a local time sensitive network.

29. The method of claim 18, wherein the TRP is instructed to transmit the retransmission via a single resource block subset allocated to the TRP.

30. The method of claim 18, wherein a resource block subset is allocated to the TRP and a different resource block subset is allocated to the different TRP.

* * * * *